(12) United States Patent
Zarkov et al.

(10) Patent No.: US 12,086,749 B2
(45) Date of Patent: *Sep. 10, 2024

(54) SYSTEM, METHOD, AND COMPUTER PROGRAM PRODUCT FOR IMPLEMENTING A HYBRID DEEP NEURAL NETWORK MODEL TO DETERMINE A MARKET STRATEGY

(71) Applicant: Visa International Service Association, San Francisco, CA (US)

(72) Inventors: Spiridon Zarkov, Singapore (SG); Anubhav Narang, Singapore (SG)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/226,858

(22) Filed: Jul. 27, 2023

(65) Prior Publication Data

US 2023/0368111 A1 Nov. 16, 2023

Related U.S. Application Data

(63) Continuation of application No. 16/536,728, filed on Aug. 9, 2019, now Pat. No. 11,755,975.

(Continued)

(51) Int. Cl.
*G06Q 10/06* (2023.01)
*G06F 17/16* (2006.01)
(Continued)

(52) U.S. Cl.
CPC ......... *G06Q 10/0637* (2013.01); *G06F 17/16* (2013.01); *G06N 3/045* (2023.01);
(Continued)

(58) Field of Classification Search
CPC .......... G06Q 10/0637; G06Q 30/0201; G06N 20/20; G06F 17/16
(Continued)

(56) References Cited

U.S. PATENT DOCUMENTS

2004/0064351 A1* 4/2004 Mikurak ............ G06Q 30/0269
705/22
2018/0284758 A1* 10/2018 Cella ...................... G06N 3/088

OTHER PUBLICATIONS

Ghosh et al., "Credit Card Fraud Detection with a Neural-Network", Proceedings of the Twenty-Seventh Hawaii International Conference on System Sciences, 1994, pp. 621-630.
(Continued)

*Primary Examiner* — Tsu-Chang Lee
(74) *Attorney, Agent, or Firm* — The Webb Law Firm

(57) ABSTRACT

Provided is a computer-implemented method for implementing a hybrid deep neural network. The method may include generating a first model comprising a generalized matrix factorization model, the generalized matrix factorization model configured to determine one or more latent factors based on receiving transaction data associated with one or more payment transactions; generating a second model comprising a deep neural network model, the deep neural network model comprising a plurality of hidden layers; generating a combined model; and determining a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data. A system and computer program product are also provided.

20 Claims, 7 Drawing Sheets

Related U.S. Application Data

(60) Provisional application No. 62/717,264, filed on Aug. 10, 2018.

(51) Int. Cl.
 *G06N 3/045*  (2023.01)
 *G06N 3/048*  (2023.01)
 *G06N 3/08*   (2023.01)
 *G06N 20/20*  (2019.01)
 *G06Q 10/0637* (2023.01)
 *G06Q 30/0201* (2023.01)

(52) U.S. Cl.
 CPC ............... *G06N 3/048* (2023.01); *G06N 3/08* (2013.01); *G06N 20/20* (2019.01); *G06Q 30/0201* (2013.01)

(58) Field of Classification Search
 USPC .......................................................... 705/7
 See application file for complete search history.

(56) References Cited

OTHER PUBLICATIONS

Zhuang et al., "Representation learning via Dual-Autoencoder for recommendation", Neural Networks 90, 2017, pp. 83-89.

\* cited by examiner

SYSTEM, METHOD, AND COMPUTER PROGRAM PRODUCT FOR IMPLEMENTING A HYBRID DEEP NEURAL NETWORK MODEL TO DETERMINE A MARKET STRATEGY

CROSS REFERENCE TO RELATED APPLICATIONS

This application is a continuation application of U.S. patent application Ser. No. 16/536,728, filed Aug. 9, 2019, which claims priority to U.S. Provisional Patent Application No. 62/717,264, filed Aug. 10, 2018, which are incorporated herein by reference in their entirety.

BACKGROUND

1. Field

This disclosure relates generally to systems, devices, products, apparatus, and methods that are used for implementing a hybrid deep neural network model, and in one particular embodiment, to a system, product, and method for implementing a hybrid deep neural network model to determine a market strategy.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed based on a set of data so that the machine learning model may perform a task (e.g., a task associated with a prediction) with regard to the set of data.

In some instances, a machine learning model, such as a predictive machine learning model, may be used to make a prediction regarding a risk or an opportunity based on data. A predictive machine learning model may be used to analyze a relationship between the performance of a unit based on data associated with the unit and one or more known features of the unit. The objective of the predictive machine learning model may be to assess the likelihood that a similar unit will exhibit the performance of the unit. A predictive machine learning model may be used as a fraud detection model. For example, predictive machine learning models may perform calculations based on data associated with payment transactions to evaluate the risk or opportunity of a payment transaction involving a customer, in order to guide a decision of whether to authorize the payment transaction.

Multiple businesses (e.g., multiple merchants) may be involved in one or more transactions involving a customer associated with an account (e.g., a credit card account, a debit card account, and/or the like). The one or more transactions may each have similar features (e.g., the one or more transactions may be associated with a price, a time at which the transaction was initiated, and/or the like). However, a financial institution and/or a transaction service provider may be unable to accurately determine an alignment between the account and a subsequent transaction in regard to activity of the account by a customer involving one or more merchants. For example, the financial institution and/or the transaction service provider may be unable to accurately determine whether the user will conduct a payment transaction that involves a first merchant or a second merchant based on the account activity. Accordingly, the financial institution and/or the transaction service provider may transmit offers to the customer that are ineffective at encouraging the customer to conduct a payment transaction. By transmitting offers that are ineffective, network resources and/or processing resources may be wasted as compared to transmitting a smaller number of offers that are effective.

SUMMARY

Accordingly, disclosed are systems, devices, products, apparatus, and/or methods for implementing a hybrid deep neural network model to determine a market strategy.

According to a non-limiting aspect or embodiment, provided is a computer-implemented method for implementing a hybrid deep neural network model to determine a market strategy. The method may include generating, by at least one processor, a first model comprising a generalized matrix factorization model, the generalized matrix factorization model configured to determine one or more latent factors based on receiving transaction data associated with one or more payment transactions; generating, by at least one processor, a second model comprising a deep neural network model, the deep neural network model comprising a plurality of hidden layers; generating, by at least one processor, a combined model, wherein the combined model comprises a combination of the first model, the second model, and a data input, wherein generating the combined model comprises concatenating the first model, the second model, and the data input; and determining, by at least one processor, a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data.

According to a non-limiting aspect or embodiment, provided is a system for implementing a hybrid deep neural network model to determine a market strategy. The system may include at least one processor programmed or configured to: generate a first model comprising a generalized matrix factorization model, the generalized matrix factorization model configured to determine one or more latent factors based on receiving transaction data associated with one or more payment transactions; generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions; generate a combined model, wherein the combined model comprises a combination of the first model, the second model, and feature data associated with one or more features, wherein generating the combined model comprises concatenating the first model, the second model, and the feature data; and determine a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data According to a non-limiting aspect or embodiment, provided is a computer program product for implementing a hybrid deep neural network model to determine a market strategy. In some non-limiting embodiments or aspects, the computer program product may comprise at least one non-transitory computer-readable medium including one or more instructions that, when executed by at least one processor, cause the at least one processor to: generate a first model comprising a generalized matrix factorization model, the generalized matrix factorization model configured to determine one or more latent factors based on receiving transaction data associated with one or more payment transactions; generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions; and generate a combined model, wherein the combined model comprises a combination of the first model, the second model, and feature data associated with one or more features, wherein generating the combined model comprises concatenating the first model, the second model, and the feature data.

Further embodiments or aspects are set forth in the following numbered clauses:

Clause 1: A method for implementing a hybrid deep neural network model to determine a market strategy, comprising: generating, by at least one processor, a first model comprising a generalized matrix factorization model, the generalized matrix factorization model configured to determine one or more latent factors based on receiving transaction data associated with one or more payment transactions; generating, by at least one processor, a second model comprising a deep neural network model, the deep neural network model comprising a plurality of hidden layers; generating, by at least one processor, a combined model, wherein the combined model comprises a combination of the first model, the second model, and a data input, wherein generating the combined model comprises concatenating the first model, the second model, and the data input; and determining, by at least one processor, a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data.

Clause 2: The method of clause 1, wherein the plurality of hidden layers of the second model comprise a first hidden layer configured to provide an output having a first amount of dimensions to a second hidden layer, the second hidden layer configured to provide an output having a second amount of dimensions less than the first amount of dimensions.

Clause 3: The method of clauses 1 or 2, wherein the generalized matrix factorization model is configured to determine 16 latent factors.

Clause 4: The method of any of clauses 1-3, wherein the data input comprises feature data associated with one or more features to be provided to a data input layer of a neural network model.

Clause 5: The method of any of clauses 1-4, wherein the transaction data is first transaction data, and wherein generating the first model comprises: training the first model based on second transaction data; and wherein generating the second model comprises: training the second model based on the second transaction data.

Clause 6: The method of any of clauses 1-5, wherein the merchant transaction data comprises: merchant category data associated with a merchant category of a payment transaction; occurrence data associated with an occurrence of a payment transaction involving a merchant; and country identification data associated with an identifier of a country.

Clause 7: The method of any of clauses 1-6, further comprising: applying, with at least one processor, an activation function that is a rectifier to an output of the combined model.

Clause 8: The method of any of clauses 1-7, wherein generating the first model comprises: applying, with at least one processor, a regularization function that is a dropout function to data associated with an input to be provided to an input layer of the first model, wherein the dropout function has a predetermined probability.

Clause 9: The method of any of clauses 1-8, wherein generating the second model comprises: applying, with at least one processor, a regularization function that is a dropout function to data associated with an input to be provided to an input layer of the second model, wherein the dropout function has a predetermined probability.

Clause 10: A system for implementing a hybrid deep neural network model to determine a market strategy, comprising: at least one processor programmed or configured to: generate a first model comprising a generalized matrix factorization model, the generalized matrix factorization model configured to determine one or more latent factors based on receiving transaction data associated with one or more payment transactions; generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions; generate a combined model, wherein the combined model comprises a combination of the first model, the second model, and feature data associated with one or more features, wherein generating the combined model comprises concatenating the first model, the second model, and the feature data; and determine a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data.

Clause 11: The system of clause 10, wherein the transaction data is first transaction data, wherein, when generating the first model, the at least one processor is programmed or configured to: train the first model based on second transaction data; and wherein, when generating the second model, the at least one processor is programmed or configured to: train the second model based on the second transaction data.

Clause 12: The system of clauses 10 or 11, wherein the merchant transaction data comprises: merchant category data associated with a merchant category of a payment transaction; occurrence data associated with an occurrence of a payment transaction involving a merchant; and country identification data associated with an identifier of a country.

Clause 13: The system of any of clauses 10-12, wherein the at least one processor is further programmed or configured to: apply an activation function that is a rectifier to an output of the combined model.

Clause 14: The system of any of clauses 10-13, wherein, when generating the first model, the at least one processor is programmed or configured to: apply a regularization function that is a dropout function to data associated with an input to be provided to an input layer of the first model, wherein the dropout function has a predetermined probability.

Clause 15: The system of any of clauses 10-14, wherein, when generating the second model, the at least one processor is programmed or configured to: apply a regularization function that is a dropout function to data associated with an input to be provided to an input layer of the second model, wherein the dropout function has a predetermined probability.

Clause 16: A computer program product for implementing a hybrid deep neural network model to determine a market strategy, the computer program product comprising at least one non-transitory computer-readable medium including one or more instructions that, when executed by at least one processor, cause the at least one processor to: generate a first model comprising a generalized matrix factorization model, the generalized matrix factorization model configured to determine one or more latent factors based on receiving transaction data associated with one or more payment transactions; generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions; and generate a combined model, wherein the combined model comprises a combination of the first model, the second model, and feature data associated with one or more features, wherein generating the combined model comprises concatenating the first model, the second model, and the feature data.

Clause 17: The computer program product of clause 16, wherein the one or more instructions further cause the at least one processor to: determine a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data Clause 18: The computer program product of clauses 16 or 17, wherein the transaction data is first transaction data, wherein, the one or more instructions that cause the at least one processor to generate the first model cause the at least one processor to: train the first model based on second transaction data; and wherein the one or more instructions that cause the at least one processor to generate the second model cause the at least one processor to: train the second model based on the second transaction data.

Clause 19: The computer program product of any of clauses 16-18, wherein the one or more instructions that further cause the at least one processor to: apply an activation function that is a rectifier to an output of the combined model.

Clause 20: The computer program product of any of clauses 16-19, wherein the one or more instructions that cause the at least one processor to generate the first model further cause the at least one processor to: apply a regularization function that is a dropout function to data associated with an input to be provided to an input layer of the first model, wherein the dropout function has a predetermined probability.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various FIGURES. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic FIGURES, in which.

DESCRIPTION

Figure 1:
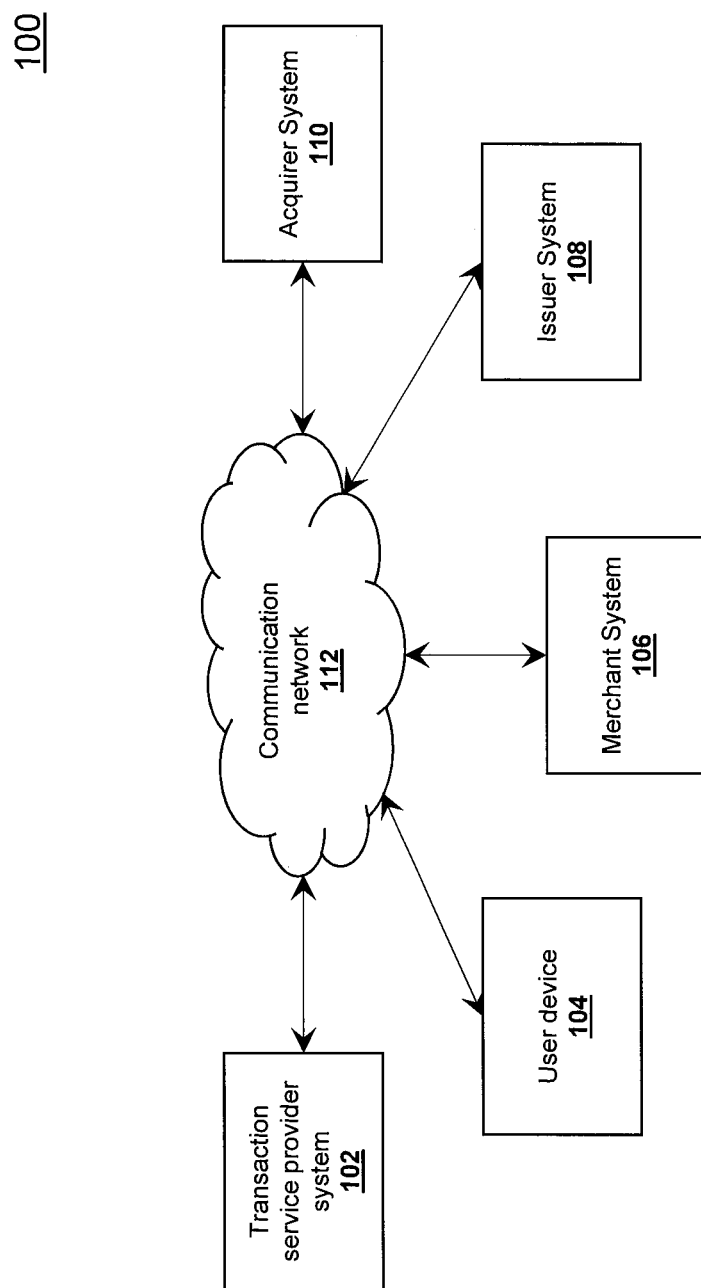
FIG. 1 is a diagram of a non-limiting embodiment of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing FIGURES. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer" may refer to one or more entities that provide accounts to individuals (e.g., users, customers, and/or the like) for conducting payment transactions such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a customer of a merchant, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments or aspects, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments or aspects, a computing device may include a server, a desktop computer, and/or the like.

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments or aspects, computer-implemented methods, systems, and computer program products for implementing a hybrid deep neural network model to determine a market strategy using a machine learning model architecture are disclosed. For example, a computer-implemented method may include generating, by at least one processor, a first model comprising a generalized matrix factorization model, the generalized matrix factorization model configured to determine one or more latent factors based on receiving transaction data associated with one or more payment transactions; generating, by at least one processor, a second model comprising a deep neural network model, the deep neural network model comprising a plurality of hidden layers; generating, by at least one processor, a combined model, wherein the combined model comprises a combination of the first model, the second model, and a data input, wherein generating the combined model comprises concatenating the first model, the second model, and the data input; and determining, by at least one processor, a rating for a payment account based on transaction data associated with a plurality of payment transactions, wherein the rating comprises an indication that the payment account will be used to conduct a plurality of payment transactions involving a merchant, and wherein the transaction data comprises merchant transaction data and user transaction data.

In this way, non-limiting embodiments of the present disclosure may accurately determine an alignment between an account and one or more merchants, where a user of the account is more likely to initiate a transaction with the one or more merchants than another one or more merchants. Accordingly, a financial institution and/or a transaction service provider may be able to transmit offers to the customer that are effective at encouraging the customer to conduct a payment transaction involving the one or more merchants. In particular, the disclosed systems, methods, and computer program products identify latent features that are encompassed by one or more payment transactions, thereby importing contextual data into one or more predictions (e.g., one or more predictions as to what offers would be effective if provided to a customer to cause the customer to initiate a payment transaction with a merchant). In this way, network resources and/or processing resources may be conserved as compared to transmitting a larger number of offers that are ineffective. Additionally, the described machine learning model architectures can be divided into sub-architectures (e.g., a first model architecture associated with a first machine learning model, a second model architecture associated with a second machine learning model, and a third model architecture associated with a third machine learning model, and/or the like), enabling the machine learning model architecture to divide the processing performed by the machine learning model across multiple systems (e.g., multiple computing devices), including one or more graphical processing units (GPUs), allowing for parallel processing of the data provided as input to the machine learning model. By processing the data provided as input in parallel, the computation time and resources needed to process the input data (e.g., when training one or more machine learning models) may be reduced (e.g., from 10 days to 3 days).

Referring now to FIG. 1, FIG. 1 is a diagram of an example environment 100 in which systems, devices, products, apparatus, and/or methods described herein may be implemented. As shown in FIG. 1, environment 100 includes merchant system 106, transaction service provider system 102, acquirer system 110, issuer system 108, and user device 104. In some non-limiting embodiments or aspects, merchant system 106, transaction service provider system 102, acquirer system 110, issuer system 108, and user device 104 may interconnect (e.g., establish a connection to communicate, and/or the like) via wired connections, wireless connections, or a combination of wired and wireless connections.

Transaction service provider system 102 may include one or more devices capable of being in communication with merchant system 106, acquirer system 110, issuer system 108, and/or user device 104 via communication network 112. For example, transaction service provider system 102 may include a server (e.g., a transaction processing server), a group of servers (e.g., a group of transaction processing servers), and/or other like devices. In some non-limiting embodiments or aspects, transaction service provider system 102 may be associated with a transaction service provider, as described herein.

User device 104 may include one or more devices capable of being in communication with merchant system 106, transaction service provider system 102, acquirer system 110, and/or issuer system 108 via communication network 112. For example, user device 104 may include one or more computing devices, such as one or more mobile devices, one or more smartphones, one or more wearable devices, one or more servers, and/or the like. In some non-limiting embodiments or aspects, user device 104 may communicate via a short-range wireless communication connection. In some non-limiting embodiments or aspects, user device 104 may be associated with a customer as described herein.

Merchant system 106 may include one or more devices capable of being in communication with transaction service provider system 102, acquirer system 110, issuer system 108, and user device 104 via communication network 112. For example, merchant system 106 may include one or more payment devices, one or more computing devices, such as one or more mobile devices, one or more smartphones, one or more wearable devices (e.g., watches, glasses, lenses, clothing, and/or the like), one or more PDAs, one or more servers, and/or the like. In some non-limiting embodiments or aspects, merchant system 106 may communicate via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). In some non-limiting embodiments or aspects, merchant system 106 may be associated with a merchant, as described herein.

Issuer system 108 may include one or more devices capable of being in communication with merchant system 106, transaction service provider system 102, acquirer system 110, and/or user device 104 via communication network 112. For example, issuer system 108 may include one or more computing devices, such as one or more servers, and/or other like devices. In some non-limiting embodiments or aspects, issuer system 108 may be associated with an issuer institution that issued a payment account and/or instrument (e.g., a credit account, a debit account, a credit card, a debit card, and/or the like) to a customer.

Acquirer system 110 may include one or more devices capable of being in communication with merchant system 106, transaction service provider system 102, issuer system 108, and/or user device 104 via communication network 112. For example, acquirer system 110 may include one or more computing devices, such as one or more servers, and/or other like devices. In some non-limiting embodiments or aspects, acquirer system 110 may be associated with an acquirer, as described herein.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
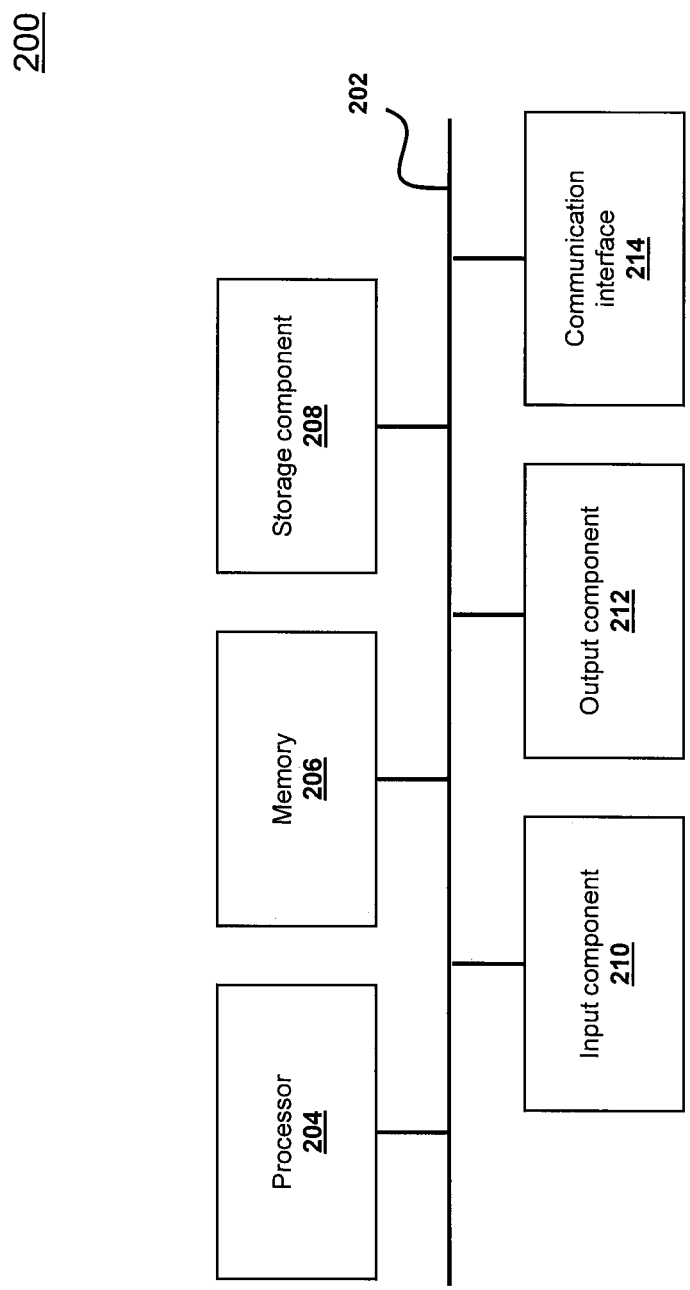
FIG. 2 is a diagram of a non-limiting aspect or embodiment of components of one or more devices and/or one or more systems of FIG. 1.

Referring now to FIG. 2, illustrated is a diagram of example components of device 200. Device 200 may correspond to one or more devices of transaction service provider system 102, one or more devices of merchant system 106 (e.g., one or more devices of a device of merchant system 106), one or more devices of acquirer system 110, one or more devices of issuer system 108, and/or one or more devices of user device 104. In some non-limiting aspects or embodiments, one or more devices of transaction service provider system 102, one or more devices of merchant system 106, one or more devices of acquirer system 110, one or more devices of issuer system 108, and/or one or more devices of user device 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting aspects or embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, a Bluetooth® interface, a Zigbee® interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of retrieving information from, storing information in, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting aspects or embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
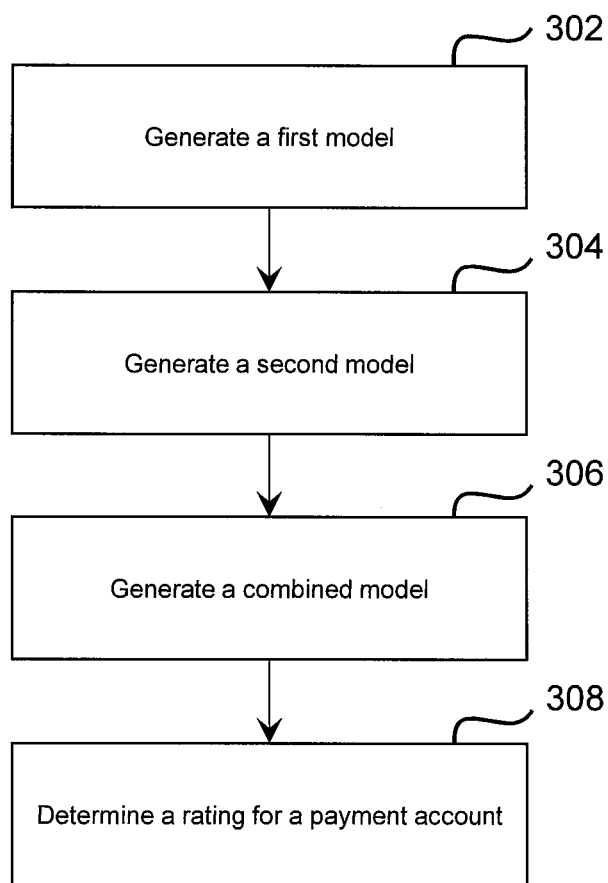
FIG. 3 is a flowchart of a non-limiting embodiment of a process for implementing a hybrid deep neural network model to determine a market strategy.

Referring now to FIG. 3, illustrated is a flowchart of a non-limiting embodiment of a process 300 for implementing a hybrid deep neural network model to determine a market strategy. In some non-limiting aspects or embodiments, one or more of the functions described with respect to process 300 may be performed (e.g., completely, partially, and/or the like) by transaction service provider system 102. In some non-limiting embodiments or aspects, one or more of the steps of process 300 may be performed (e.g., completely, partially, and/or the like) by another device or a group of devices separate from and/or including transaction service provider system 102 such as, for example, user device 104, merchant system 106, issuer system 108, and/or acquirer system 110.

As shown in FIG. 3, at step 302, process 300 may include generating a first model. For example, transaction service provider system 102 may generate a first model. In such an example, the first model may be the same as and/or similar to a collaborative filtering structure (e.g., a filtering structure that determines predictions based on combinations of preferences of a user). In some non-limiting embodiments or aspects, transaction service provider system 102 may generate the first model based on transaction data associated with one or more payment transactions (e.g., first transaction data associated with one or more payment transactions). For example, transaction service provider system 102 may generate the first model based on the first transaction data associated with one or more payment transactions, where the first transaction data includes merchant data associated with a merchant (e.g., a merchant associated with merchant system 106) and/or account data associated with an account of one or more users (e.g., users associated with one or more user devices 104-1-104-n, collectively referred to as user of user device 104). In some non-limiting embodiments or aspects, transaction service provider system 102 may generate the first model by training the first model using transaction data associated with the one or more payment transactions. For example, transaction service provider system 102 may generate the first model by training the first model using the first transaction data associated with one or more payment transactions.

In some non-limiting embodiments or aspects, transaction service provider system 102 may generate the first model, where the first model includes a generalized factorization model. Transaction service provider system 102 may configure (e.g., configure to be used) the generalized factorization model to determine one or more latent factors (e.g., 16 latent factors) of one or more payment transactions. For example, transaction service provider system 102 may configure the generalized factorization model to determine one or more latent factors of the one or more payment transactions based on transaction service provider system 102 providing first transaction data associated with one or more payment transactions as input to the generalized factorization model. In such an example, transaction service provider system 102 may provide the first transaction data associated with the one or more payment transactions.

In some non-limiting embodiments or aspects, transaction service provider system 102 may generate the first model by applying a regularization function to data provided as input to an input layer of the first model. For example, transaction service provider system 102 may generate the first model by applying the regularization function to data provided as input to an input layer of the first model, where the regularization function is a dropout function. In such an example, transaction service provider system 102 may apply the dropout function to the data provided as input to the input layer of the first model to regularize the data provided as input, thereby reducing the likelihood that the first model will be overfit when generated by transaction service provider system 102. In some non-limiting embodiments or aspects, the dropout function may have a predetermined probability.

As shown in FIG. 3, at step 304, process 300 may include generating a second model. For example, transaction service provider system 102 may generate a second model. In some non-limiting embodiments or aspects, transaction service provider system 102 may generate the second model based on first transaction data associated with one or more payment transactions. For example, transaction service provider system 102 may generate the second model based on first transaction data that may include merchant data associated with a merchant (e.g., a merchant associated with merchant system 106) and/or account data associated with an account of one or more users (e.g., a user associated with user device 104). In some non-limiting embodiments or aspects, transaction service provider system 102 may generate the second model by training the second model based on transaction data associated with one or more payment transactions. For example, transaction service provider system 102 may generate the second model by training the second model based on the first transaction data associated with the one or more payment transactions.

In some non-limiting embodiments or aspects, transaction service provider system 102 may generate the second model, where the second model includes a deep neural network model. For example, transaction service provider system 102 may generate the second model, where the second model includes a deep neural network model, the deep neural network model including one or more hidden layers. In such an example, the one or more hidden layers of the deep neural network model may include a first hidden layer configured to (e.g., configured to be used to) provide an output having a first amount of dimensions to a second hidden layer, the second hidden layer configured to provide an output having a second amount of dimensions that are less than the first amount of dimensions to a third hidden layer. In some non-limiting embodiments or aspects, the deep neural network model may have more or fewer hidden layers that are configured to provide outputs having amounts of dimensions that are greater than, less than, or equal to the amount of dimensions of any other hidden layer. In some non-limiting embodiments or aspects, transaction service provider system 102 may generate the second model, where the second model includes a deep neural network model, the deep neural network model including one or more hidden layers, where each successive hidden layer is configured to receive input having a number of dimensions that is greater than or equal to an amount of dimensions of an output provided by the successive hidden layer.

In some non-limiting embodiments or aspects, transaction service provider system 102 may generate the second model by applying a regularization function to data provided as input to an input layer of the second model. For example, transaction service provider system 102 may generate the second model by applying the regularization function to data provided as input to an input layer of the second model, where the regularization function is a dropout function. In such an example, transaction service provider system 102 may apply the dropout function to the data provided as input to the input layer of the second model to regularize the data provided as input, thereby reducing the likelihood that the first model will be overfit when generated by transaction service provider system 102. In some non-limiting embodiments or aspects, the dropout function may have a predetermined probability.

As shown in FIG. 3, at step 306, process 300 may include generating a combined model. For example, transaction service provider system 102 may generate a combined model. In some non-limiting embodiments or aspects, transaction service provider system 102 may generate the combined model by combining the first model, the second model, and feature data associated with one or more features. For example, transaction service provider system 102 may generate the combined model by concatenating the first model, the second model, and the feature data associated with the one or more features.

In some non-limiting embodiments or aspects, the feature data associated with the one or more features may be provided to a data input layer of a neural network model. For example, transaction service provider system 102 may provide the feature data associated with the one or more features to a first data input layer of a neural network. In some non-limiting embodiments or aspects, transaction service provider system 102 may additionally provide an output of the first model and/or an output of the second model to the first data input layer of the neural network.

In some non-limiting embodiments or aspects, transaction service provider system 102 may provide an output of the first layer of the neural network to a second layer of the neural network. In such an example, the second layer of the neural network may provide, as an output, a combined model output. In some non-limiting embodiments or aspects, transaction service provider system 102 may provide the combined model output as input to an activation function. For example, transaction service provider system 102 may provide the combined model output as input to an activation function, where the activation function is a rectifier to the combined model output.

In some non-limiting embodiments or aspects, the combined model output may include transaction data associated with one or more payment transactions. For example, the combined model output may include transaction data associated with one or more payment transactions, where at least one payment transaction is a predicted payment transaction involving a user of an account and a merchant associated with a merchant identifier. In another example, the combined model output may include transaction data associated with a plurality of payment transactions. In some non-limiting embodiments or aspects, the combined model output may include feature data associated with one or more features of one or more payment transactions.

As shown in FIG. 3, at step 308, process 300 may include determining a rating for a payment account. For example, transaction service provider system 102 may determine a rating for a payment account. In some non-limiting embodiments or aspects, transaction service provider system 102 may determine a rating for a payment account based on transaction data associated with one or more payment transactions. For example, transaction service provider system 102 may determine a rating for a payment account based on providing the transaction data associated with the one or more payment transactions (e.g., one or more payment transactions involving accounts of one or more users and one or more merchants) to the combined model. In such an example, transaction service provider system 102 may receive a combined model output based on providing the transaction data associated with the one or more transactions to the combined model. In some non-limiting embodiments or aspects, the combined model output may include the transaction data associated with the one or more payment transactions that were provided by transaction service provider system 102 to the combined model and/or predicted transaction data associated with one or more predicted payment transactions. Transaction service provider system 102 may then determine the rating for the payment account based on the combined model output.

In some non-limiting embodiments or aspects, the rating for the payment account may include an indication that the payment account will be used to conduct one or more predicted payment transactions. For example, the rating for the payment account may include an indication that the payment account will be used to conduct one or more payment transactions involving a user of an account and a merchant. In some non-limiting embodiments or aspects, transaction data associated with one or more payment transactions may include merchant transaction data and user transaction data.

In some non-limiting embodiments or aspects, transaction service provider system 102 may determine merchant transaction data associated with a future transaction. For example, transaction service provider system 102 may determine the merchant transaction data based on determining the predicted payment transaction and/or based on the combined model output. In some non-limiting embodiments or aspects, merchant transaction data associated with a future transaction may include merchant category data associated with a merchant category (e.g., a merchant category of a payment transaction), occurrence data associated with an occurrence of a payment transaction (e.g., a payment transaction involving a merchant and/or one or more users), and/or country identification data associated with an identifier of one or more countries.

Figure 4A:
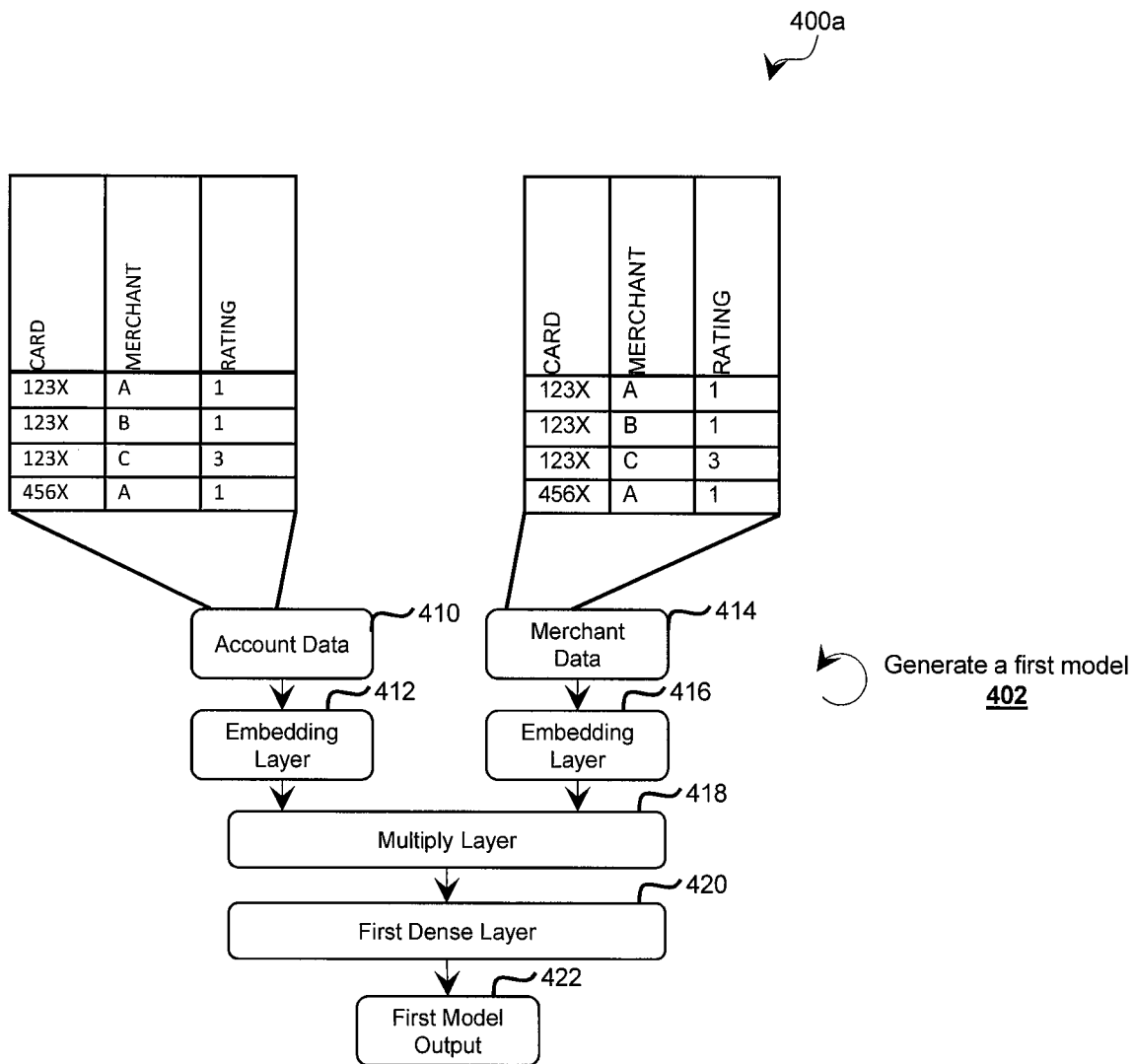
FIGS. 4A-4D are a diagram of a non-limiting embodiment of a machine learning model architecture for implementing a hybrid deep neural network model to determine a market strategy.
Figure 4B:
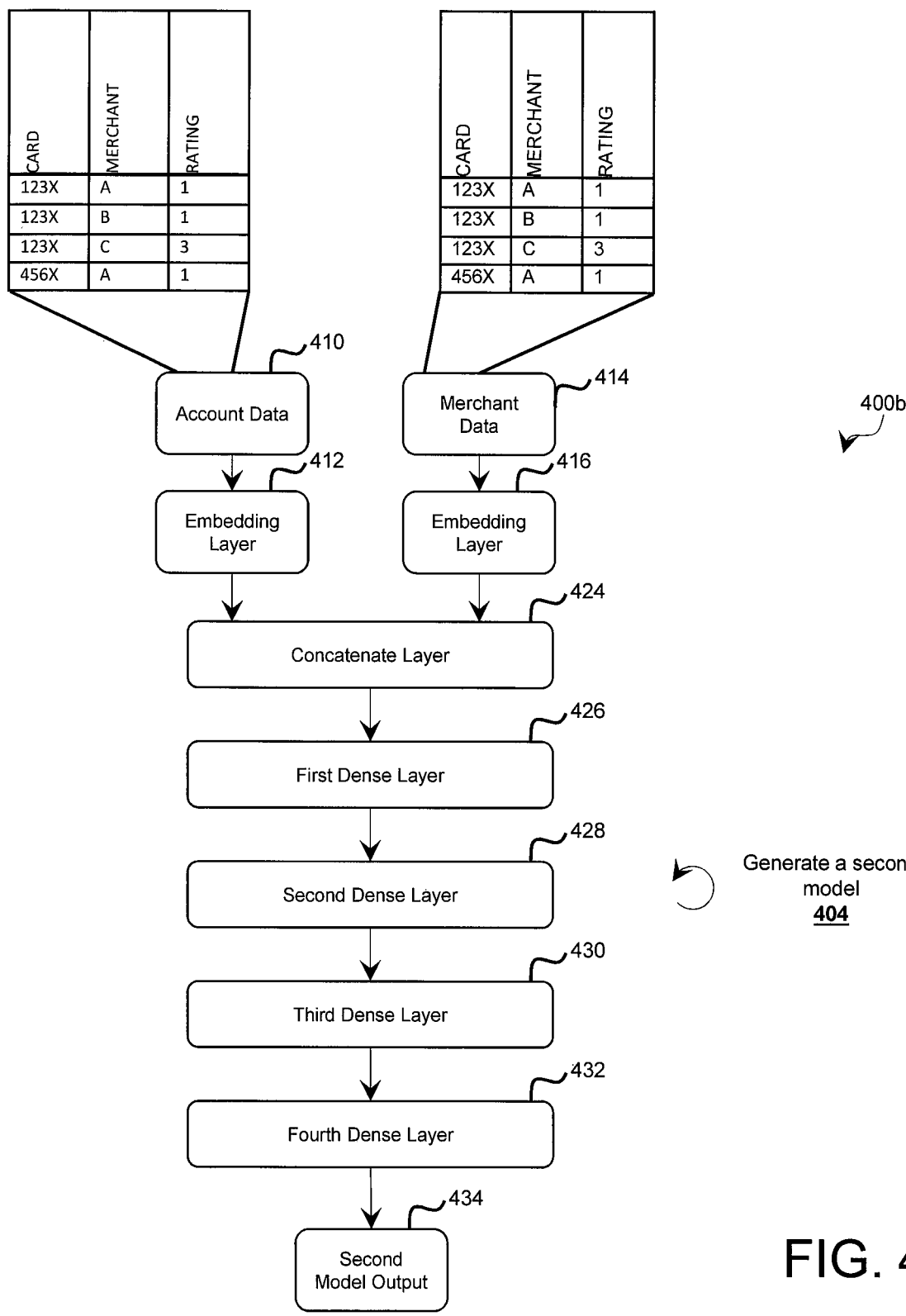
Figure 4C:
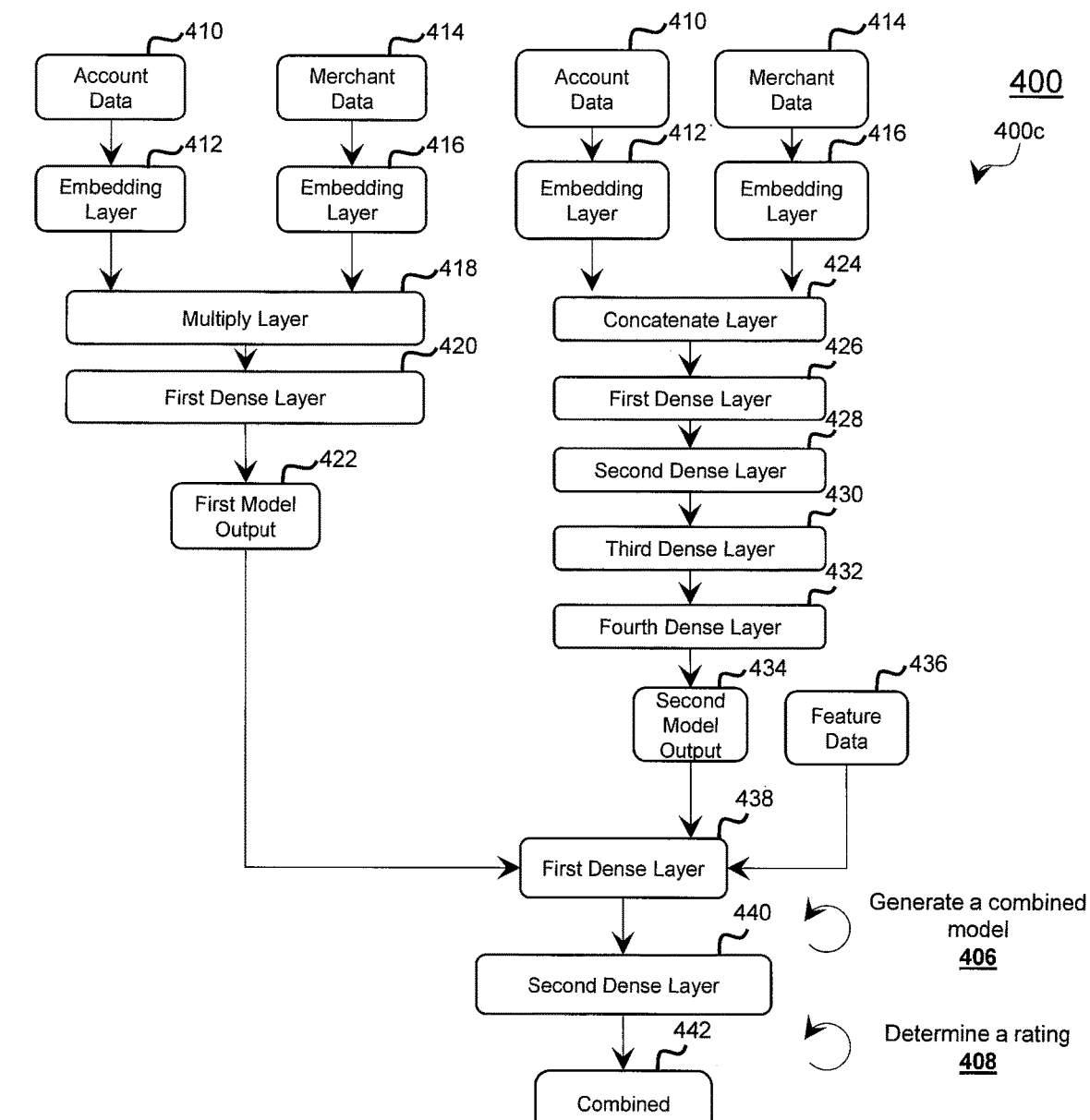
Figure 4D:
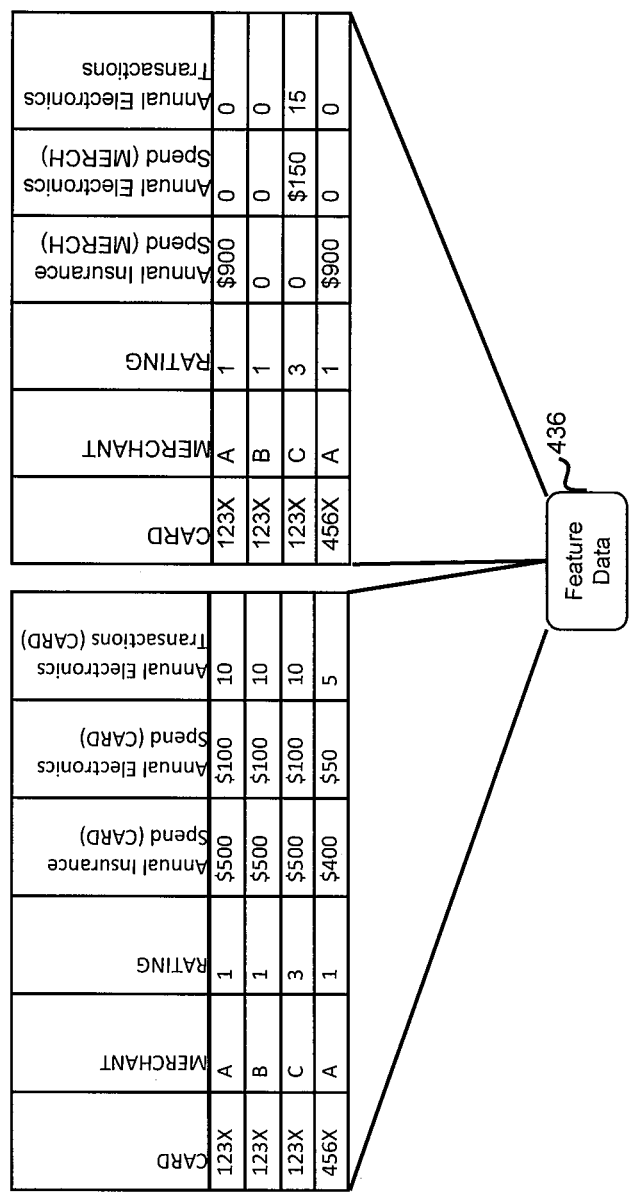

Referring now to FIGS. 4A-4D, illustrated is a diagram of an implementation 400 of a process (e.g., process 300) for implementing a hybrid deep neural network model to determine a market strategy. As illustrated in FIGS. 4A-4D, implementation 400 may include first machine learning model 400a which may include account data 410, embedding layer 412, merchant data 414, embedding layer 416, multiply layer 418, first dense layer 420, and first model output 422. Implementation 400 may also include second machine learning model 400b which may include account data 410, embedding layer 412, merchant data 414, embedding layer 416, concatenate layer 424, first dense layer 426, second dense layer 428, third dense layer 430, fourth dense layer 432, and second model output 434. Implementation 400 may also include third machine learning model 400c which may include feature data 436 (as shown in FIG. 4D), first dense layer 438, second dense layer 440, and combined model output 442. In some non-limiting embodiments or aspects, machine learning model architecture 400 may be included in transaction service provider system 102.

As shown by reference number 402 in FIG. 4A, transaction service provider system 102 may generate a first machine learning model 400a. For example, transaction service provider system 102 may generate a first model, the first model including account data 410, embedding layer 412, merchant data 414, embedding layer 416, multiply layer 418, and first dense layer 420. In some non-limiting embodiments or aspects, account data 410 may include account data associated with an account. For example, account data 410 may include account data associated with an account, the account being associated with one or more account identifiers (e.g., a credit card number, an account number, and/or the like). For example, account data associated with one or more accounts may include data associated with one or more payment transactions that include an account identifier, a merchant identifier, and/or rating data associated with a rating (e.g., card 123x may assign a rating of "1" to a merchant "A"; card 123x may assign a rating of "1" to a merchant "B", card 123x may assign a rating of "3" to a merchant "C", card 456x may assign a rating of "1" to the merchant "A", and/or the like, where the ratings represent a percent of spending involving the user of the account and the merchant involved in the payment transaction as compared to a total spending amount of the user). In some non-limiting embodiments or aspects, the account data associated with the account may include feature data associated with one or more features, the one or more features associated with one or more market segments. For example, the one or more market segments may include a market segment associated with a telecommunication industry, a market segment associated with an insurance industry, a market segment associated with a food and/or grocery industry, a market segment associated with a transportation industry, a market segment associated with a fuel industry, a market segment associated with a restaurant industry, a market segment associated with a quick service restaurant industry, a market segment associated with an entertainment industry, a market segment associated with a professional services industry, a market segment associated with a retail goods industry, a market segment associated with an apparel and accessories industry, a market segment associated with an education and/or a government industry, a market segment associated with a department store industry, a market segment associated with a retail services industry, a market segment associated with an electronics industry, a market segment associated with a health care industry, a market segment associated with a drug store and/or pharmacy industry, a market segment associated with a discount store industry, a market segment associated with a direct marketing industry, a market segment associated with a lodging industry, a market segment associated with a business to business industry, a market segment associated with a home improvement and/or supply industry, a market segment associated with a travel service industry, a market segment associated with an automotive industry, a market segment associated with a vehicle rental industry, and/or the like. In some non-limiting embodiments or aspects, embedding layer 412 may be configured to receive account data 410 as an input to embedding layer 412. In some non-limiting embodiments or aspects, embedding layer 412 may be configured to determine an embedding (e.g., a vector including one or more dimensions, each dimension further including a value). For example, embedding layer 412 may be configured to determine an embedding including 64 dimensions based on (e.g., in response to) embedding layer 412 receiving account data 410, with each dimension of the embedding including a value. In some non-limiting embodiments or aspects, embedding layer 412 may be configured to provide an output (e.g., the embedding determined based on the account data 410) of embedding layer 412 to multiply layer 418. In some non-limiting embodiments or aspects, embedding layer 412 may be a neural network including one or more hidden layers, including one or more embedding layers.

As shown by FIG. 4A, merchant data 414 may include merchant data associated with a merchant. For example, merchant data 414 may include merchant data associated with a merchant, the merchant associated with a merchant category code (MCC) and/or a merchant identifier (e.g., a unique number that identifies the merchant). In some non-limiting embodiments or aspects, merchant data 414 may be the same as, or similar to, account data 410. In some non-limiting embodiments or aspects, embedding layer 416 may be configured to receive merchant data 414 as an input to embedding layer 416. In some non-limiting embodiments or aspects, embedding layer 416 may be configured to determine an embedding. For example, embedding layer 416 may be configured to determine an embedding including 64 dimensions based on (e.g., in response to) receiving merchant data 414, with each dimension of the embedding including a value. In some non-limiting embodiments or aspects, embedding layer 416 may be configured to provide an output (e.g., the embedding determined based on merchant data 414) of embedding layer 416 to multiply layer 418. In some non-limiting embodiments or aspects, embedding layer 416 may be a neural network including one or more hidden layers, including one or more embedding layers. In some non-limiting embodiments or aspects, the output of embedding layer 416 may include one or more values that collectively define a relationship between one or more users of one or more accounts and one or more merchants.

In some non-limiting embodiments or aspects, multiply layer 418 may be configured to receive the output from embedding layer 412 and embedding layer 416. For example, multiply layer 418 may be configured to receive the output from embedding layer 412 and embedding layer 416 as inputs to multiply layer 418. In some non-limiting embodiments or aspects, multiply layer 418 may be configured to multiply (e.g., via an element-wise multiplication operation) the output from embedding layer 412 and embedding layer 416 received as input at multiply layer 418. For example, multiply layer 418 may be configured to multiply based on (e.g., in response to) receiving the output from embedding layer 412 and embedding layer 416. In some non-limiting embodiments or aspects, multiply layer 418 may be configured to provide an output of multiply layer 418 to first dense layer 420. For example, multiply layer 418 may be configured to provide an output of multiply layer 418, where the output is a predicted rating for a future payment transaction.

In some non-limiting embodiments or aspects, first dense layer 420 (e.g., a first layer of first machine learning model 400a including 128 nodes) may be configured to receive the output from multiply layer 418. For example, first dense layer 420 may be configured to receive the output from multiply layer 418 as inputs to first dense layer 420. In some non-limiting embodiments or aspects, first dense layer 420 may be configured to determine an output based on receiving the output from multiply layer 418 as input. For example, first dense layer 420 may be configured to determine an output based on receiving the output from multiply layer 418 as input based on (e.g., in response to) receiving the output from multiply layer 418. In some non-limiting embodiments or aspects, first dense layer 420 may be configured to provide first model output 422 of first dense layer 420. For example, first dense layer 420 may be configured to provide first model output 422 to first dense layer 438 of third machine learning model 400c (see FIG. 4C). In some non-limiting embodiments or aspects, first dense layer 420 may be configured to receive input via one or more nodes and first dense layer 420 may be configured to provide output via 1 node (e.g., a scalar value).

As shown by reference number 404 in FIG. 4B, transaction service provider system 102 may generate a second model. For example, transaction service provider system 102 may generate a second machine learning model 400b, where second machine learning model 400b includes account data 410, embedding layer 412, merchant data 414, embedding layer 416, concatenate layer 424, first dense layer 426, second dense layer 428, third dense layer 430, and fourth dense layer 432. In some non-limiting embodiments or aspects, embedding layer 412 may be configured to receive account data 410 as an input to embedding layer 412. In some non-limiting embodiments or aspects, embedding layer 412 may be configured to provide an output of embedding layer 412 to concatenate layer 424. Embedding layer 416 may be configured to receive merchant data 414 as an input to embedding layer 416. In some non-limiting embodiments or aspects, embedding layer 416 may be configured to provide an output of embedding layer 416 to concatenate layer 424.

In some non-limiting embodiments or aspects, concatenate layer 424 may be configured to receive the output from embedding layer 412 and embedding layer 416. For example, concatenate layer 424 may be configured to receive the output from embedding layer 412 and embedding layer 416 as inputs to concatenate layer 424. In some non-limiting embodiments or aspects, concatenate layer 424 may be configured to concatenate (e.g., append and/or link) the output of embedding layer 412 and embedding layer 416. For example, concatenate layer 424 may be configured to concatenate the output of embedding layer 412 and embedding layer 416 based on (e.g., in response to) receiving the output from embedding layer 412 and embedding layer 416. In some non-limiting embodiments or aspects, concatenate layer 424 may be configured to provide an output (e.g., an embedding including 64 dimensions) of concatenate layer 424 to first dense layer 426.

In some non-limiting embodiments or aspects, first dense layer 426 may be configured to receive the output from concatenate layer 424. For example, first dense layer 426 may be configured to receive the output from concatenate layer 424 as inputs to first dense layer 426. In some non-limiting embodiments or aspects, first dense layer 426 may be configured to determine an output (e.g., values output via one or more nodes of first dense layer 426) based on receiving the output from concatenate layer 424 as input. For example, first dense layer 426 may be configured to determine an output based on (e.g., in response to) receiving the output from concatenate layer 424. In some non-limiting embodiments or aspects, first dense layer 426 may be configured to provide an output of first dense layer 426 to second dense layer 428. In some non-limiting embodiments or aspects, first dense layer 426 may be configured to receive input via 64-128 nodes and first dense layer 426 may be configured to provide output via 32-64 nodes.

In some non-limiting embodiments or aspects, second dense layer 428 may be configured to receive the output from first dense layer 426. For example, second dense layer 428 may be configured to receive the output from first dense layer 426 as inputs to second dense layer 428. In some non-limiting embodiments or aspects, second dense layer 428 may be configured to determine an output. For example, second dense layer 428 may be configured to determine an output based on (e.g., in response to) receiving the output from first dense layer 426. In some non-limiting embodiments or aspects, second dense layer 428 may be configured to provide an output of second dense layer 428 to third dense layer 430. In some non-limiting embodiments or aspects, second dense layer 428 may be configured to receive input via 32-64 nodes and second dense layer 428 may be configured to provide output via 16-32 nodes.

In some non-limiting embodiments or aspects, third dense layer 430 may be configured to receive the output from second dense layer 428. For example, third dense layer 430 may be configured to receive the output from second dense layer 428 as inputs to third dense layer 430. In some non-limiting embodiments or aspects, third dense layer 430 may be configured to determine an output. For example, third dense layer 430 may be configured to determine an output based on (e.g., in response to) receiving the output from second dense layer 428. In some non-limiting embodiments or aspects, third dense layer 430 may be configured to provide an output of third dense layer 430 to fourth dense layer 432. In some non-limiting embodiments or aspects, third dense layer 430 may be configured to receive input via 16-32 nodes and third dense layer 430 may be configured to provide output via 8-16 nodes.

In some non-limiting embodiments or aspects, fourth dense layer 432 may be configured to receive the output from third dense layer 430. For example, fourth dense layer 432 may be configured to receive the output from third dense layer 430 as inputs to fourth dense layer 432. In some non-limiting embodiments or aspects, fourth dense layer 432 may be configured to determine an output. For example, fourth dense layer 432 may be configured to determine an output based on (e.g., in response to) receiving the output from third dense layer 430. In some non-limiting embodiments or aspects, fourth dense layer 432 may be configured to provide second model output 434 as an output from fourth dense layer 432. For example, fourth dense layer 432 may be configured to provide second model output 434 as an output from fourth dense layer 432 to first dense layer 438 of third machine learning model 400c (see FIG. 4C). In some non-limiting embodiments or aspects, fourth dense layer 432 may be configured to receive input via 16-32 nodes and fourth dense layer 432 may be configured to provide output via 8-16 nodes.

With continued reference to FIG. 4C, first dense layer 438 may be configured to receive first model output 422 (see FIG. 4A), second model output 434 (see FIG. 4B) and feature data 436 (see FIG. 4D) that is associated with one or more features (e.g., values of one or more features). For example, feature data may be associated with one or more features, the one or more features having values derived from data associated with the one or more features (e.g., account data associated with an account of a user, merchant data associated with a merchant involved in a transaction, rating data associated with a predicted rating that a future transaction involving a user and a merchant will be initiated, insurance spending data associated with annual insurance spending of the user and/or a merchant, electronics spending data associated with annual electronics spending of the user and/or a merchant, electronic transaction data associated with an amount of electronic transactions initiated by the user and/or a merchant, and/or the like). In some non-limiting embodiments or aspects, first dense layer 438 may be configured to receive first model output 422, second model output 434 and feature data 436 as inputs to first dense layer 438. In some non-limiting embodiments or aspects, first dense layer 438 may be configured to determine an output. For example, first dense layer 438 may be configured to determine an output based on (e.g., in response to) receiving first model output 422, second model output 434, and/or feature data 436. In some non-limiting embodiments or aspects, first dense layer 438 may be configured to provide an output of first dense layer 438 to second dense layer 440. For example, first dense layer 438 may be configured to provide an output of first dense layer 438 to second dense layer 440. In some non-limiting embodiments or aspects, first dense layer 426 may be configured to receive input via one or more nodes and first dense layer 426 may be configured to provide output via one or more different nodes. For example, first dense layer 426 may be configured to receive input via one or more nodes and first dense layer 426 may be configured to provide output via one or more different nodes, where a first set of nodes are associated with first model output 422, a second set of nodes are associated with second model output 434, and a third set of nodes are associated with feature data 436. In some non-limiting embodiments or aspects, the first set of nodes, second set of nodes, and third set of nodes may be independent of each other (e.g., may include nodes that are not included in the other nodes, respectively).

As shown by reference number 406 in FIG. 4C, transaction service provider system 102 may generate a combined model. For example, transaction service provider system 102 may generate a combined model including first model output 422, second model output 434, feature data 436, first dense layer 438, and second dense layer 440. In some non-limiting embodiments or aspects, second dense layer 440 may be configured to receive the output from first dense layer 438. For example, second dense layer 440 may be configured to receive the output from first dense layer 438 as inputs to second dense layer 440. In some non-limiting embodiments or aspects, second dense layer 440 may be configured to determine an output. For example, second dense layer 440 may be configured to determine an output based on (e.g., in response to) receiving the first dense layer 438 as input to second dense layer 440. In some non-limiting embodiments or aspects, second dense layer 440 may be configured to provide combined model output 442 as an output of second dense layer 440. In some non-limiting embodiments or aspects, second dense layer 428 may be configured to receive input via one or more nodes and second dense layer 428 may be configured to provide output via one node. For example, second dense layer 428 may be configured to receive input via one or more nodes and second dense layer 428 may be configured to provide output via one node, where the output provided by second dense layer 440 is combined model output 442.

As shown by reference number 408 in FIG. 4C, transaction service provider system 102 may determine a rating. For example, transaction service provider system 102 may determine a rating based on combined model output 442. In some non-limiting embodiments or aspects, combined model output 442 may include a prediction (e.g., transaction data associated with a predicted transaction, transaction data associated with a plurality of payment transactions where the plurality of payment transactions includes a predicted payment transaction, and/or the like). In some non-limiting embodiments or aspects, transaction service provider system 102 may determine a rating for a future payment transaction based on the combined model output.

Although the above systems, devices, products, apparatus, and/or methods have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method, comprising:
generating, by at least one processor of a transaction service provider system, a first model comprising a generalized matrix factorization machine learning model, the generalized matrix factorization machine learning model configured to determine one or more latent factors of one or more payment transactions involving a payment account of a user based on first transaction data associated with the one or more payment transactions involving the payment account of the user, wherein generating the first model comprises:
training the generalized matrix factorization machine learning model based on the first transaction data;
generating, by at least one processor of the transaction service provider system, a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions, and wherein generating the second model comprises:
training the deep neural network model based on second transaction data associated with the one or more payment transactions, wherein the second transaction data comprises merchant transaction data associated with a merchant and user transaction data associated with the user;
generating, by at least one processor of the transaction service provider system, a combined neural network model, wherein the combined neural network model comprises a combination of the first model, the deep neural network model, and feature data associated with one or more features to be provided to a data input layer of the combined neural network model, wherein the feature data comprises data associated with a plurality of features, and wherein the plurality of features comprises:
a feature regarding account data associated with an account of a user;
a feature regarding merchant data associated with a merchant involved in a transaction;
a feature regarding rating data associated with a predicted rating that a future transaction involving the user will be initiated; and
generating, by at least one processor of the transaction service provider system, an output of the combined neural network model, wherein the output of the combined neural network model comprises feature data associated with one or more features of one or more payment transactions to be conducted using the payment account of the user.

2. The method of claim 1, further comprising:
determining a prediction based on the output of the combined neural network model, wherein the prediction comprises an indication that the payment account will be used to conduct a plurality of payment transactions involving the merchant.

3. The method of claim 1, wherein the generalized matrix factorization machine learning model is configured to determine 16 latent factors.

4. The method of claim 1, wherein generating the combined neural network model comprises:
concatenating the generalized matrix factorization machine learning model, the deep neural network model, and the feature data.

5. The method of claim 1, wherein training the first model comprises:
applying a first regularization function to the first transaction data that is provided as input to an input layer of the generalized matrix factorization machine learning model.

6. The method of claim 1, wherein the merchant transaction data comprises:
merchant category data associated with a merchant category of a payment transaction;
occurrence data associated with an occurrence of a payment transaction involving a merchant; and
country identification data associated with an identifier of a country.

7. The method of claim 1, wherein training the deep neural network model comprises:
applying a second regularization function to the merchant transaction data associated with the merchant and the user transaction data associated with the user that is provided as input to an input layer of the deep neural network model.

8. A system, comprising:
at least one processor of a transaction service provider system, wherein the at least one processor is programmed or configured to:
generate a first model comprising a generalized matrix factorization machine learning model, the generalized matrix factorization machine learning model configured to determine one or more latent factors of one or more payment transactions involving a payment account of a user based on first transaction data associated with the one or more payment transactions involving the payment account of the user, wherein, when generating the first model, the at least one processor is programmed or configured to:
train the generalized matrix factorization machine learning model based on the first transaction data;
generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions, and wherein, when generating the second model, the at least one processor is programmed or configured to:
train the deep neural network model based on second transaction data associated with the one or more payment transactions, wherein the second transaction data comprises merchant transaction data associated with a merchant and user transaction data associated with the user;

generate a combined neural network model, wherein the combined neural network model comprises a combination of the first model, the deep neural network model, and feature data associated with one or more features to be provided to a data input layer of the combined neural network model, wherein the feature data comprises data associated with a plurality of features, and wherein the plurality of features comprises:

a feature regarding account data associated with an account of a user;

a feature regarding merchant data associated with a merchant involved in a transaction;

a feature regarding rating data associated with a predicted rating that a future transaction involving the user will be initiated; and generate an output of the combined neural network model, wherein the output of the combined neural network model comprises feature data associated with one or more features of one or more payment transactions to be conducted using the payment account of the user.

9. The system of claim 8, wherein the at least one processor is further programmed or configured to:

determine a prediction based on the output of the combined neural network model, wherein the prediction comprises an indication that the payment account will be used to conduct a plurality of payment transactions involving the merchant.

10. The system of claim 8, wherein the generalized matrix factorization machine learning model is configured to determine 16 latent factors.

11. The system of claim 8, wherein, when generating the combined neural network model, the at least one processor is programmed or configured to:

concatenate the generalized matrix factorization machine learning model, the deep neural network model, and the feature data.

12. The system of claim 8, wherein, when training the first model, the at least one processor is programmed or configured to:

apply a first regularization function to the first transaction data that is provided as input to an input layer of the generalized matrix factorization machine learning model.

13. The system of claim 8, wherein the merchant transaction data comprises:

merchant category data associated with a merchant category of a payment transaction;

occurrence data associated with an occurrence of a payment transaction involving a merchant; and country identification data associated with an identifier of a country.

14. The system of claim 8, wherein, when training the deep neural network model, the at least one processor is programmed or configured to:

apply a second regularization function to the merchant transaction data associated with the merchant and the user transaction data associated with the user that is provided as input to an input layer of the deep neural network model.

15. A non-transitory computer-readable medium including one or more instructions that, when executed by at least one processor of a transaction service provider system, cause the at least one processor to:

generate a first model comprising a generalized matrix factorization machine learning model, the generalized matrix factorization machine learning model configured to determine one or more latent factors of one or more payment transactions involving a payment account of a user based on first transaction data associated with the one or more payment transactions involving the payment account of the user, wherein, the one or more instructions that cause the at least one processor to generate the first model, cause the at least one processor to:

train the generalized matrix factorization machine learning model based on the first transaction data;

generate a second model comprising a deep neural network model, the deep neural network model comprising a plurality of hidden layers, wherein the plurality of hidden layers of the second model comprise a first hidden layer configured to provide an output having a first amount of dimensions to a second hidden layer, the second hidden layer configured to provide an output having a second amount of dimensions less than the first amount of dimensions, and wherein, the one or more instructions that cause the at least one processor to generate the second model, cause the at least one processor to:

train the deep neural network model based on second transaction data associated with the one or more payment transactions, wherein the second transaction data comprises merchant transaction data associated with a merchant and user transaction data associated with the user;

generate a combined neural network model, wherein the combined neural network model comprises a combination of the first model, the deep neural network model, and feature data associated with one or more features to be provided to a data input layer of the combined neural network model, wherein the feature data comprises data associated with a plurality of features, and wherein the plurality of features comprises:

a feature regarding account data associated with an account of a user;

a feature regarding merchant data associated with a merchant involved in a transaction;

a feature regarding rating data associated with a predicted rating that a future transaction involving the user will be initiated; and generate an output of the combined neural network model, wherein the output of the combined neural network model comprises feature data associated with one or more features of one or more payment transactions to be conducted using the payment account of the user.

16. The non-transitory computer-readable medium for claim 15, wherein the one or more instructions further cause the at least one processor to:

determine a prediction based on the output of the combined neural network model, wherein the prediction comprises an indication that the payment account will be used to conduct a plurality of payment transactions involving the merchant.

17. The non-transitory computer-readable medium for claim 15, wherein the generalized matrix factorization machine learning model is configured to determine 16 latent factors.

18. The non-transitory computer-readable medium for claim 15, wherein, the one or more instructions that cause the at least one processor to generate the combined neural network model, cause the at least one processor to:

concatenate the generalized matrix factorization machine learning model, the deep neural network model, and the feature data.

19. The non-transitory computer-readable medium for claim 15, wherein, the one or more instructions that cause the at least one processor to train the first model, cause the at least one processor to:

apply a first regularization function to the first transaction data that is provided as input to an input layer of the generalized matrix factorization machine learning model.

20. The non-transitory computer-readable medium for claim 15, wherein, the one or more instructions that cause the at least one processor to train the deep neural network model, cause the at least one processor to:

apply a second regularization function to the merchant transaction data associated with the merchant and the user transaction data associated with the user that is provided as input to an input layer of the deep neural network model.

\* \* \* \* \*